May 2, 1961 D. A. STAHR 2,982,484
FEED PROCESSING MECHANISM
Filed July 17, 1958 3 Sheets-Sheet 1

Inventor
Donald A. Stahr
by Donald H. Zarley
Attorney

Witness
Edward P. Seeley

May 2, 1961 D. A. STAHR 2,982,484
FEED PROCESSING MECHANISM
Filed July 17, 1958 3 Sheets-Sheet 2

Witness
Edward P. Seeley

Inventor
Donald A. Stahr
by Donald H. Zarley
Attorney

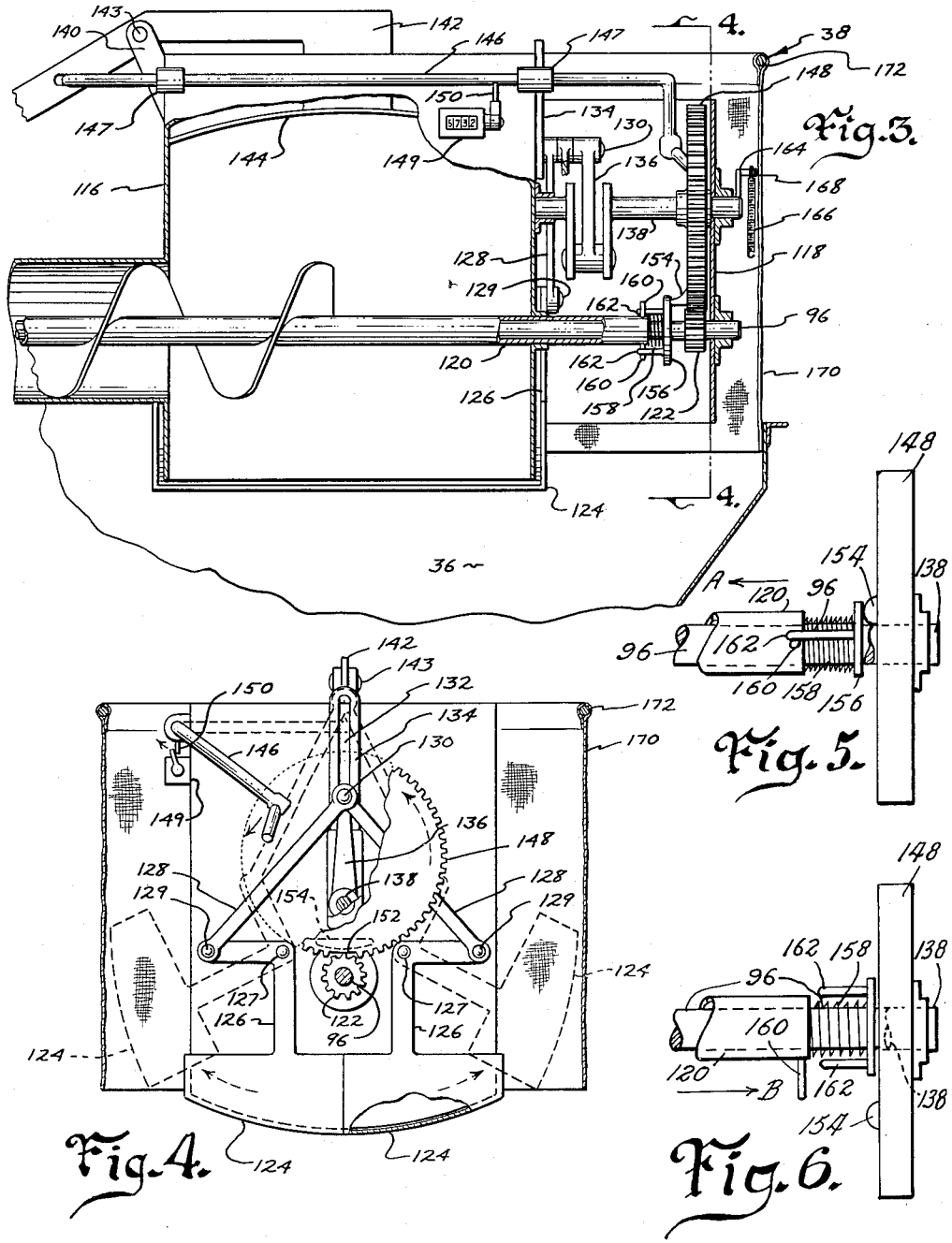

United States Patent Office 2,982,484
Patented May 2, 1961

2,982,484

FEED PROCESSING MECHANISM

Donald A. Stahr, Rte. 2, Sumner, Iowa

Filed July 17, 1958, Ser. No. 749,094

3 Claims. (Cl. 241—101)

My invention relates to a feed processing mechanism and more particularly to a device which is comprised of a combination of elements which can condition, measure and mix the feed components.

The highly technical procedures now used in the feeding of domestic farm animals has presented a great many problems. For some time, it has proved desirable to grind the grain that is used as a feed component, and even later feed supplements have been added to the conditioned grain to provide a superior feed product. The exact proportions of grain and supplement in the ultimate product must be carefully controlled and even a slight departure from established proportions can greatly upset the feeding habits of the stock. Therefore, the stock feeding operation on the modern farm can only be completed after the grain has been ground, measured and mixed with either a supplement feed or a different kind of grain.

Most farms have a conventional hammer mill or the equivalent thereof to grind the corn, oats and other grain that is to be used in the feeding operation. Next, the ground grain is carefully measured and placed in some sort of mixing apparatus where it is combined in proper proportions with a feed supplement or other ground grain. Thus, the modern farmer must perform several distinct operations to provide feed for his stock in that the grain must be deposited in a grinding mechanism; removed therefrom and measured; re-deposited in a mixing apparatus; combined with a desirable supplement or other grain; mixed; and then deposited in the feeding units for the stock.

One of the greatest handicaps in performing this operation is that the grain must be handled at least two or three times, i.e., before grinding, before measuring and before mixing—and then, sometimes before being placed in the feed bunks.

A further shortcoming in performing this operation with conventional devices is that a separate power mechanism must be provided for each device, or a single power mechanism must be moved from device to device as the operation develops.

A still further shortcoming of using conventional devices to perform this operation is that even though the ground grain is reduced to known quantities, the final proportions of ground feed are no more accurate than the memory of the operator as he deposits the measured feed into the mixing apparatus.

Therefore, the principal object of my invention is to provide a single feed processing mechanism which will grind, measure, and mix the feed in a continuous operation.

A further object of my invention is to provide a single feed processing mechanism which will accurately and automatically determine the quantity of feed being processed.

A still further object of my invention is to provide a feed processing mechanism that can have all phases of its mechanism operated by a single source of power.

A still further object of my invention is to provide a feed processing mechanism that can be moved about to facilitate delivery of the feed to the feeding units.

A still further object of my invention is to provide a feed processing mechanism that is durable in use, refined in appearance and economical of manufacture.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 3 is a partial sectional view of the measuring unit on my device and is taken on line 3—3 in Fig. 1;

Fig. 4 is a sectional view of my device taken on line 4—4 of Fig. 3;

Fig. 5 is a top view of the control means for one of my auger shafts as depicted in Fig. 3; and Fig. 6 is a view similar to that of Fig. 5 but shows the various parts in a different stage of their operation.

Figure 1:
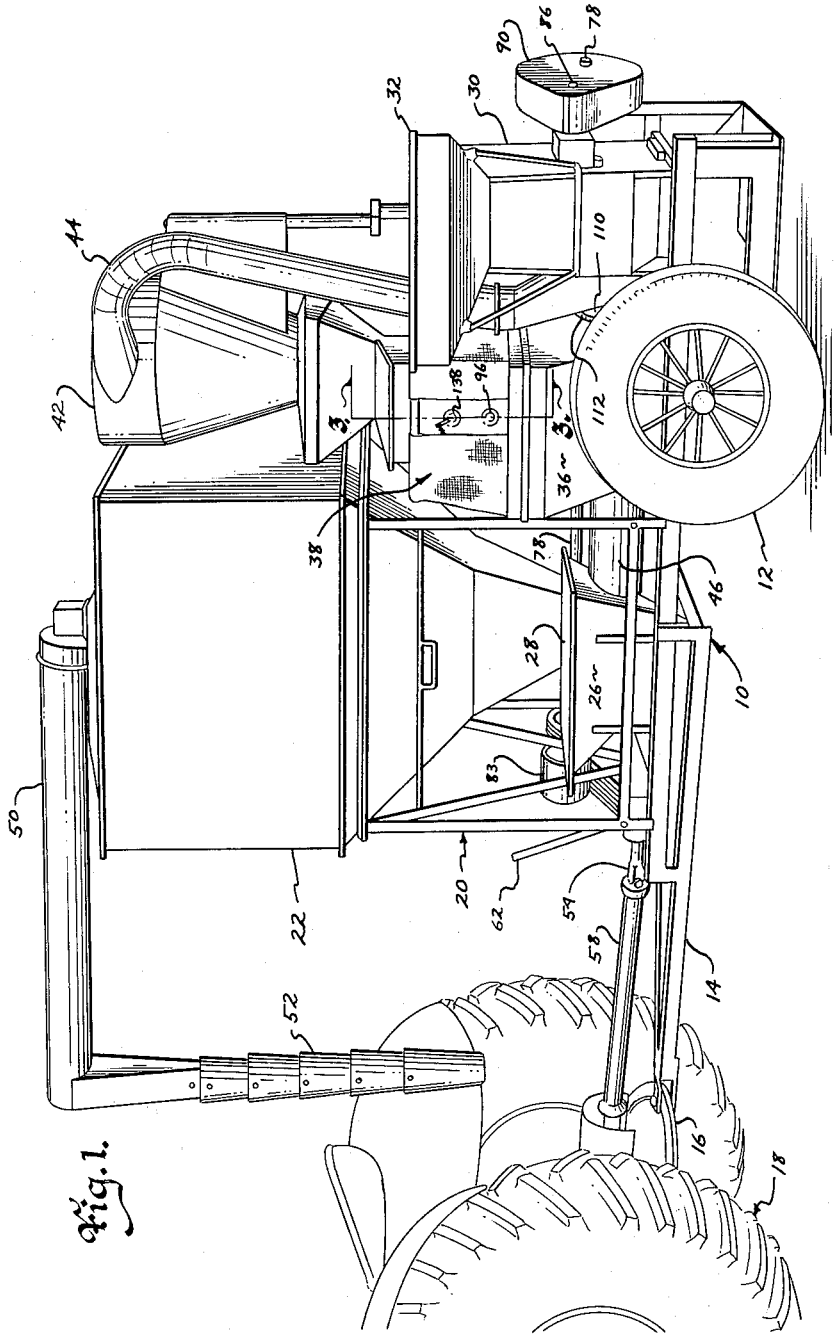
Fig. 1 is a perspective view of my device operatively connected to a farm tractor and specifically shows one side and the rearward end of my device.

I have used the numeral 10 to generally designate the frame for my device which is mounted in any convenient manner on wheels 12. Only one such wheel 12 is viewed in Fig. 1. The frame 10 has a forwardly extending tongue 14 which can be attached in conventional fashion to the drawbar 16 of tractor 18.

An auxiliary frame 20 extends upwardly from the forward end of frame 10 to support mixing bin 22. The lower portion of mixing bin 22 tapers inwardly and terminates in circular container 24 which is in communication with supplement bin 26. Supplement bin 26 can also be mounted on frame 10 and has a removable lid 28.

A conventional hammer mill 30 is mounted on the rearward end of frame 10 and has a conventional receiving chute 32 attached thereto. A fan housing 34 having a conventional fan therein is located at the bottom of hammer mill 30 so as to receive the ground particles of grain.

Figure 2:
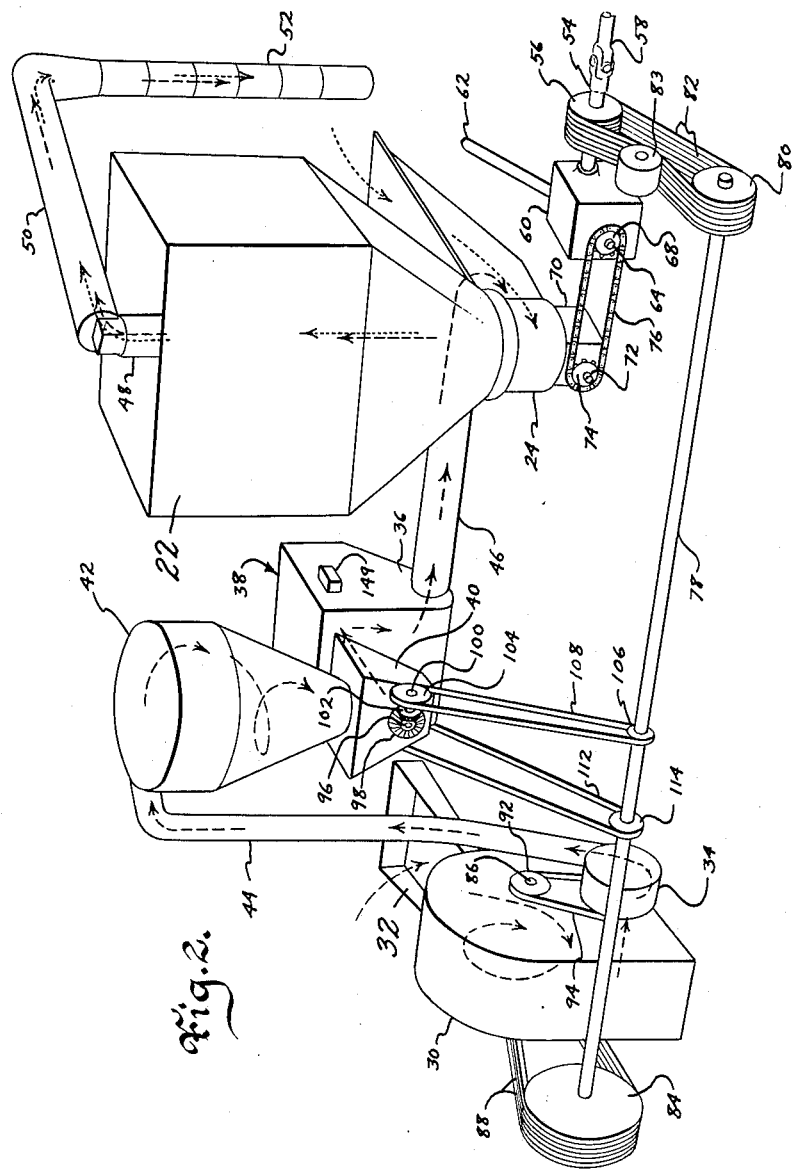
Fig. 2 is a schematic view of the power mechanism and path of flow of the grain in and through my device. The view in Fig. 2 is taken from the opposite position of Fig. 1 and therefore shows the opposite side and the front-ward end of my device.

A dumping bin 36 is mounted on one side of frame 10 forwardly of hammer mill 30. The numeral 38 generally designates my measuring device which is mounted on top of dumping bin 36. Measuring device 38 will be discussed in detail hereafter. As shown in Fig. 2, measuring bin 40 extends outwardly from the upper portion of one side of dumping bin 36 and supports the inverted conical shaped dust collector 42. Conduit 44 connects the top of duct dust collector 42 with the fan housing 34 on hammer mill 30. Conduit 46 connects the lower portion of dumping bin 36 with the upper portion of supplement bin 26.

An adjustable telescoping conduit 48 is mounted in any convenient manner within the center of mixing bin 22 and extends from the bottom portion thereof outwardly through the top of the bin. Not shown in my drawings and not constituting a part of my invention is a control on conduit 48 for moving its ends toward and away from the top and bottom of mixing bin 22. A horizontally positioned conduit 50 is movably connected by one of its ends to the center top of mixing bin 22 and is in communication with the upper end of conduit 48. The outer end of conduit 50 terminates in flexible spout 52. At this point, it should be noted that I do not expect my invention to be limited to the specific structure of the hammer mill, measuring unit or mixing bin, but my invention concerns itself with the novel combination of these three elements.

The numeral 54 designates a stub shaft which can be rotatably mounted in any convenient manner on the forward end of frame 10. A multiple belt pulley 56 is rigidly secured to shaft 54. The forward end of shaft 54 may be connected in any convenient manner to power shaft 58 which in turn is connected to the power take-off mechanism of tractor 18. The inward end of shaft 54 is operatively connected to gear box 60 which is mounted on frame 10. A clutch lever 62 is operatively connected to gear box 60 for selectively connecting shaft 54 to the gear box output shaft 64. A sprocket wheel 68 is secured to the outer end of output shaft 64. A gear box 70 with shaft 72 is mounted on the bottom of container 24 at the bottom of mixing bin 22. A sprocket wheel 74 is mounted on shaft 72 and link chain 76 connects sprocket wheels 74 and 68. Shaft 72 and gear box 70 act to operate auger elements (not shown) which are located in conduits 48 and 50 as well as on the bottoms of container 24 and supplement bin 26. These augers will be discussed hereafter.

Jack shaft 78 is rotatably mounted to frame 10 in any convenient manner and extends along one side of the frame. A multi-belt pulley 80 is rigidly secured to the forward end of jack shaft 78 and is in alignment with pulley 56 on shaft 54. A plurality of belts 82 connect pulleys 56 and 80. A conventional belt tightening mechanism 83 is movably connected to frame 10 to selectively tighten belts 82 upon pulleys 56 and 80.

A large multi-belt pulley 84 is rigidly secured to the rearward end of jack shaft 78 and is in alignment with a pulley (not shown) on the power shaft 86 of hammer mill 30. Belts 88 operatively connect the pulley on shaft 86 with the pulley 84 on jack shaft 78. In Fig. 1, belts 88 are shown to be enclosed within a housing 90 which is mounted on shafts 78 and 86.

The forward end of the hammer mill power shaft 86 has pulley 92 secured thereto. A belt 94 connects pulley 92 with the power shaft (not shown) of the fan mechanism in fan housing 34.

A horizontal shaft 96 extends through the lower portion of measuring bin 40 into the measuring unit 38. Shaft 96 is rotatably mounted in bearing members in the outside walls of the bin 40 and measuring unit 38. One end of shaft 96 can extend beyond bin 40, as shown in Fig. 2, and bevel gear 98 can be rigidly secured thereon. A stub shaft 100 can be mounted to bin 40 perpendicularly to this end of shaft 96. Shaft 100 is shown in Fig. 2 but the details of its mounting have been omitted since they do not comprise a part of my invention and since they fall completely within the realms of mechanical expediency. A bevel gear 102 is rigidly secured to one end of stub shaft 100 and is in mesh with bevel gear 98 on the end of shaft 96. A belt pulley 104 is rigidly secured to the other end of stub shaft 100 and is in alignment with belt pulley 106 which is rigidly mounted on jack shaft 78. A continuous belt 108 connects pulleys 104 and 106.

The conduit 46 which extends from the bottom of dumping bin 36 to the stop of supplement bin 26 houses a conventional auger shaft (not shown) which extends across the bottom of dumping bin 36, through conduit 46 and into supplement bin 26. The rearward end of the auger shaft extends beyond the rearward wall of dumping bin 36 and receives belt pulley 110 which is partially shown above wheel 12 in Fig. 1. A belt 112 connects pulley 110 with a belt pulley 114 which is rigidly secured to jack shaft 78.

Figs. 3 and 4 show one form of measuring unit that can be successfully used with my invention. A rectangular container 116 of predetermined size is mounted in any convenient manner on the top of dumping bin 36.

A bearing wall 118 is also secured to the top of bin 36 in spaced apart relation to the outer end wall of container 116. As shown in Fig. 3, shaft 96, which extends through the bottom of measuring bin 40 as depicted in Fig. 2, passes through container 116 and has its outer end rotatably mounted in bearing wall 118. An auger shaft 120 is slidably mounted upon shaft 96 and has substantially the same length as shaft 96. A small gear 122 is rigidly secured to the end of shaft 96 just inside bearing wall 118.

The bottom of container 116 is open and can be selectively closed by buckets 124 as shown in Fig. 4. Each bucket has an oppositely disposed inverted L-shaped arm 126 extending upwardly therefrom and the rigid elbow of each arm 126 is pivotally connected by pins 127 to the end wall of container 116. The free ends of arms 126 are pivotally connected to arms 128 by pins 129 which have their upper ends pivotally connected to horizontal stub shaft 130. Stub shaft 130 is adapted to slide in the vertical slot 132 of bracket 134 which is secured to the end wall of bin 116. The upper end of connecting rod 136 is also pivotally secured to stub shaft 130 and the lower end of the connecting rod 136 is pivotally connected to crankshaft 138. Crankshaft 138 is rotatably mounted between the end wall of container 116 and bearing wall 118 as shown in Fig. 3. Crankshaft 138 is mounted above shaft 96 and holds connecting rod 136 in the vertical position shown in Fig. 4 when buckets 124 are in their closed position under container 116.

As shown in Fig. 3, an ear 140 extends from the inner end wall of container 116 and arm 142 is pivotally secured thereon by pin 143. Arm 142 extends over the top of container 116 and a substantially horizontal float member 144 is secured thereto. A horizontal rod 146 is rotatably mounted in bearing members 147 on the side of container 116. The inner end of rod 146 is sent inwardly and loosely connected to arm 142 as shown in Fig. 3. The other end of rod 146 is bent inwardly to engage gear 148 at times. Gear 148 is rigidly connected to crankshaft 138 at a point just inside bearing wall 118 directly above gear 122. Gear 148 may have a depression (not shown) to receive the end of rod 146 so that the gear will be held against rotation when rod 146 is in engagement therewith. The bent end portions of rod 146 are of such length that whenever a slight clockwise rotational impulse is given rod 146 (as viewed in Fig. 4) by arm 142, the end of the rod will disengage gear 148. A conventional counter mechanism 149 is mounted on container 116 below rod 146 to engage a pin 150 which projects from the rod to effect the counting and recording of the rotational impulses given to the rod.

Gear 148 is longer than the gear 122 and is adapted to mesh therewith except when the smooth portion 152 on the periphery of the gear 148 is adjacent the gear 122. This relationship of the two gears is shown in Fig. 4 and it should be noted that gear 148 is always in this position when the outer end of rod 146 is in engagement with the gear to hold the gear against rotation.

A crescent-shaped lug 154 is located on the inner face of gear 148 adjacent the smooth portion 152. A disc 156 is slidably mounted in grooves (not shown) appearing in shaft 96 so that the disc can rotate with the shaft while at the same time can be moved along the longitudinal axis of the shaft. Disc 156 is of sufficient diameter to engage lug 154 at times. A spring 158 on shaft 96 engages the end of the auger shaft 120 and urges disc 156 toward gear 122. Pins 160 extend laterally from the end of auger shaft 120 and pins 162 extend inwardly toward pins 160 from disc 156. Pins 162 are of such length that when disc 156 is forced into a position adjacent gear 122 by spring 158, they will not engage pins 160 on auger shaft 120. However, pins 162 are of sufficient length that when crescent-shaped lug 154 engages disc 156 to urge the disc toward the end of the auger shaft 120 by compressing spring 158, the pins 162 will engage the pins 160 on the end of the auger shaft.

A small arm 164 is rigidly secured to the outermost end of crankshaft 138 as shown in Fig. 3. A spring 166 has one end rigidly secured to dumping bin 36 and the other end pivotally secured to the upper end of arm 164 by pin 168. While in this position, spring 166 is always urging crankshaft 138 and gear 148 to rotate in a counter-clockwise direction as viewed in Fig. 4. It should be noted that gear 148 will always be so urged when rod 146 is holding the gear against rotation and the smooth portion 152 of the gear is adjacent gear 122. These relative positions of the various elements are shown by the solid lines in Figs. 3 and 4. A curtain 170 can be placed about the measuring unit by rod 172 which is secured thereto to prevent the scattering of the fine dust from the ground grain.

I will first describe the operation of my measuring unit 38 and then describe the operation of my entire invention. Let it be assumed that rotational power is being delivered to shaft 96 in a clockwise direction, as viewed in Fig. 4. Gear 122 will thereupon rotate with shaft 96 but when the smooth portion 152 of gear 148 is adjacent gear 122, gear 148 will not be induced to rotate. Spring 166 is urging gear 148 to rotate but rod 146 is in engagement with the gear, as described above, to hold it against rotation.

With the smooth portion 152 of gear 148 adjacent gear 122, the crescent-shaped lug on gear 148 has necessarily moved into engagement with disc 156 as shown in Fig. 3 to urge the pins 162 on the disc into engagement with the pins 160 on the end of auger shaft 120. Thus, shaft 96 will rotate auger shaft 120 through the clutch mechanism of disc 156.

The rotation of auger shaft 120 will bring any ground grain in measuring bin 40 into container 116. The capacity of container 116 under float 144 is obviously predetermined. When the container 116 becomes filled with grain, the grain itself exerts an upward force on float 144, which causes the outer end of arm 142 to rotate downwardly about pin 143. The downward rotation of the outer end of arm 142 induces a slight impulse of rotation to rod 146, as viewed in Fig. 4, and causes the outer end of rod 146 to disengage gear 148. The rotational impulse is recorded as the pin 150 on rod 146 actuates the counter mechanism 149.

When rod 146 is disengaged from gear 148, the spring 166 then begins to rotate crankshaft 138 and gear 148 in a counterclockwise direction, as viewed in Fig. 4, so that the smooth portion 152 on gear 148 moves away from gear 148 and the two gears becomes meshed. As the smooth portion 152 of gear 148 moves away from gear 122, the crescent-shaped lug 154 on gear 148 disengages disc 156. Spring 158 then expands and slides the disc and pins 162 out of engagement with the pins 160 on auger shaft 120. Thus, the auger shaft 120 is temporarily disengaged.

As gear 122 meshes with and rotates gear 148, crankshaft 138 rotates also and by actuating the connecting rod 136, the stub shaft 130 is moved upwardly within the vertical bracket 134. The upper ends of arms 128 are also pulled upwardly by pin 130 which causes buckets 124 to pivot on pins 127 to assume the open position shown by the dotted lines in Fig. 4.

The control of shaft 120 can be further understood by observing Figs. 5 and 6 which are top views of the shaft 120 as depicted in Fig. 3. In Fig. 5, the lug 154 has engaged the disc 156 and has pushed the disc to the left in the direction of arrow A to compress spring 158. The movement of disc 156 to the left will cause pin 162 on disc 156 to overlap pin 160 on shaft 120. Thus, the rotation of shaft 120 and pin 160 will cause the simultaneous rotation of pin 162 which is secured to disc 156 which in turn is secured to shaft 96. Fig. 6 shows the position of the aforementioned elements when lug 154 has disengaged disc 156. When this happens, the spring 158 will expand and force disc 156 to the right in the direction of arrow B so that its pins 162 will disengage the pin 160 on shaft 120. Thus, shafts 120 and 96 will be operatively disengaged. Lug 154, being mounted on the periphery of gear 148, will come into engagement with disc 156 upon each revolution of the gear 148 about shaft 138.

One complete revolution of gear 148 will once again bring the smooth portion 152 of gear 148 into position adjacent gear 122. As soon as the ground grain is dumped by the opening of buckets 124, rod 146 is rotated back to its "locking position" with respect to gear 148 and this locking of gear 148 with respect to the rod is effected whenever the gear 148 completes one revolution to return its "locking" depression (not shown) into engagement with the end of the rod. The return of gear 148 to its original position will permit lug 154 to effect the reengagement of disc 156 with auger shaft 120. The important phases of this measuring operation are the simultaneous dumping and counting of a known quantity of grain while at the same time temporarily stopping the flow of grain into the measuring unit.

My device can be operated by applying rotational power to stub shaft 54 from the tractor power take-off shaft 58. The auger systems in mixing bin 22 can be separately controlled by actuating lever 62 on gear box 60. The belt tightening mechanism 83 can be used to tighten belts 82 to induce rotation to jack shaft 78. The rotation of jack shaft 78 will supply rotational power to the shaft 86 of hammer mill 30 through belts 88. Jack shaft 78 can also provide rotational power to the shaft 96 in measuring unit 38 through belt 108 and rotational power to the auger in conduit 46 between the dumping bin 36 and supplement bin 26 is supplied by belt 112. The fan in housing 34 is operated by the belt 94 which derives power from the shaft 86 in hammer mill 30.

By referring to Fig. 2, it is seen that grain can be deposited in chute 32 and is ground in conventional fashion by hammer mill 30. The ground grain is then blown by the fan in housing 34 upwardly through conduit 44 into the dust collector 42 and measuring bin 40. The ground grain is then carried into the measuring unit 38 by the auger shaft 120 and is measured, counted and dumped into bin 36 as described above. The auger in conduit 46 then carries the ground grain from the dumping bin into the supplement bin. A supplement feed may be inserted into the supplement bin, as shown by the fine dotted line in Fig. 2, and the actuating of lever 62 on gear box 60 will provide power to shaft 72 and the auger thereon to carry the feed into mixing bin 22. Or, a different kind of grain may be fed through my machine after a predetermined quantity of original grain has been deposited in the mixing bin.

Since the mixing bin 22 and jack shaft 78 are independently controlled by lever 62 and belt tightener 83, respectively, jack shaft 78 does not need to operate while the feed is being deposited through spout 52 into the feeding units, and the augers in the feeding bin can be operated only through the time of mixing and feeding, if desired. These two separate controls save in the horsepower consumption of my device although all elements must have power at certain intervals.

The ground grain is accurately measured before it is mixed and my counter device, which is actuated each time container 116 is dumped, relieves the operator of remembering how many units have been processed.

From the foregoing, it will be seen that my device accomplishes at least all of its stated objectives.

Some changes may be made in the construction and arrangement of my feed processing mechanism without departing from the real spirit and purpose of my invention, and it is my intention to cover by my claims, any modified forms of structure or use of mechanical equivalents which may be reasonably included within their scope.

I claim:

1. In a feed processing machine, a frame, a hammer mill on said frame, a feed measuring unit on said frame, a feed mixing bin on said frame, a first conduit connecting said hammer mill and said feed measuring unit, a fan means disposed in said first conduit for blowing feed from said hammer mill through said first conduit to said measuring unit, a first bin on said measuring unit in communication with said first conduit, a second bin on said measuring unit, a second conduit connecting said first and second bins, a shaft in said second conduit, an auger means on said shaft, a dumping mechanism on said measuring unit, means connecting said dumping mechanism and said shaft, a measuring element operatively secured to said dumping mechanism to actuate said dumping mechanism when a predetermined amount of feed enters said second bin, a third conduit connecting said second bin and said mixing bin, conveying means in said third conduit for conveying feed from said second bin to said mixing bin, power means on said frame, means connecting said power means and said hammer mill, said fan, said shaft, said conveying means and said mixing bin to simultaneously supply operating power thereto.

2. In a feed processing machine, a frame, a hammer mill on said frame, a feed measuring unit on said frame, a feed mixing bin on said frame, a first conduit connecting said hammer mill and said feed measuring unit, a fan means disposed in said first conduit for blowing feed from said hammer mill through said first conduit to said measuring unit, a first bin on said measuring unit in communication with said first conduit, a second bin on said measuring unit, a second conduit connecting said first and second bins, a shaft in said second conduit, an auger means on said shaft, a dumping mechanism on said measuring unit, means connecting said dumping mechanism and said shaft, a measuring element operatively secured to said dumping mechanism to actuate said dumping mechanism when a predetermined amount of feed enters said second bin, a counting mechanism on said measuring unit and adapted to be actuated by said dumping mechanism whenever said dumping mechanism is actuated by said measuring element, a third conduit connecting said second bin and said mixing bin, conveying means in said third conduit for conveying feed from said second bin to said mixing bin, power means on said frame, means connecting said power means and said hammer mill, said fan, said shaft, said conveying means and said mixing bin to simultaneously supply operating power thereto.

3. In a feed processing machine, a frame, a hammer mill on said frame, a feed measuring unit on said frame, a feed mixing bin on said frame, a first conduit connecting said hammer mill and said feed measuring unit, a fan means disposed in said first conduit for blowing feed from said hammer mill through said first conduit to said measuring unit, a first bin on said measuring unit in communication with said first conduit, a second bin on said measuring unit, a second conduit connecting said first and second bins, a shaft in said second conduit, an auger means on said shaft, a dumping mechanism on said measuring unit, means connecting said dumping mechanism and said shaft, a measuring element operatively secured to said dumping mechanism to actuate said dumping mechanism when a predetermined amount of feed enters said second bin, means on said dumping mechanism to remove said auger means from operative engagement with said shaft while said dumping mechanism is being actuated, a third conduit connecting said second bin and said mixing bin, conveying means in said third conduit for conveying feed from said second bin to said mixing bin, power means on said frame, means connecting said power means and said hammer mill, said fan, said shaft, said conveying means and said mixing bin to simultaneously supply operating power thereto.

References Cited in the file of this patent

UNITED STATES PATENTS

| | | |
|---|---|---|
| 680,889 | Schutz | Aug. 20, 1901 |
| 2,381,505 | Lindholm | Aug. 7, 1945 |
| 2,408,221 | Michel | Sept. 24, 1946 |
| 2,546,747 | Herr | Mar. 27, 1951 |
| 2,815,941 | Schmale | Dec. 10, 1957 |
| 2,833,485 | Rothhaar | May 6, 1958 |

FOREIGN PATENTS

| | | |
|---|---|---|
| 541,042 | Canada | May 21, 1957 |